US012621241B1

(12) United States Patent
Li

(10) Patent No.: US 12,621,241 B1
(45) Date of Patent: May 5, 2026

(54) AVOIDING RETRY ABUSES IN SERVICE-ORIENTED ARCHITECTURES

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 55 days.

(21) Appl. No.: 18/939,680

(22) Filed: Nov. 7, 2024

(51) Int. Cl.
H04L 47/12 (2022.01)

(52) U.S. Cl.
CPC .................................... H04L 47/12 (2013.01)

(58) Field of Classification Search
CPC ....................................................... H04L 47/12
See application file for complete search history.

(56) References Cited

U.S. PATENT DOCUMENTS

| | | | | |
|---|---|---|---|---|
| 8,806,490 | B1 * | 8/2014 | Pulsipher | G06Q 10/10 |
| | | | | 718/100 |
| 10,175,892 | B1 * | 1/2019 | Kim | G06F 3/0653 |
| 2002/0126410 | A1 * | 9/2002 | Doi | G11B 27/327 |

| | | | | |
|---|---|---|---|---|
| 2004/0083304 | A1 * | 4/2004 | Usuki | H04L 45/36 |
| | | | | 709/238 |
| 2004/0143691 | A1 * | 7/2004 | Brown | G06F 13/364 |
| | | | | 710/110 |
| 2008/0234105 | A1 * | 9/2008 | Sakamoto | F16H 61/12 |
| | | | | 477/124 |
| 2009/0235111 | A1 * | 9/2009 | Suzuki | G06F 11/1443 |
| | | | | 709/239 |
| 2011/0161913 | A1 * | 6/2011 | Garimella | G06F 8/60 |
| | | | | 717/174 |
| 2019/0317533 | A1 * | 10/2019 | Sitnikov | F16K 31/0644 |
| 2022/0276935 | A1 * | 9/2022 | Kumar | G06F 11/0781 |

* cited by examiner

*Primary Examiner* — Joseph D Torres
(74) *Attorney, Agent, or Firm* — Fish & Richardson P.C.

(57) ABSTRACT

Methods, systems, and computer-readable storage media for a retry framework for executing retries by adding header(s) or additional data to an existing header to calls in a workflow and using a retry history table to record retries between services. In some examples, each call between services includes header(s) or additional data in a header to uniquely identify a workflow that the call belongs to and to uniquely identify a branch of the workflow. If a service is to retry a call, the service queries the retry history table to determine a number of times the call has been retried, if any. If the call has not been retried, or has been retried less than a threshold number of times, the service updates the retry history table and executes the retry. If the call has been retried at least the threshold number of times, the service returns an error.

20 Claims, 5 Drawing Sheets

AVOIDING RETRY ABUSES IN SERVICE-ORIENTED ARCHITECTURES

BACKGROUND

Cloud computing can be described as Internet-based computing that provides shared computer processing resources and data to computers and other devices on demand. Users can establish respective sessions, during which processing resources and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. In cloud-based environments, applications can be provisioned using services, also referred to as microservices, which have gained popularity in service-oriented architectures (SOAs). In SOAs, applications are composed of multiple, independent services, and are deployed in standalone containers with a well-defined interface. The services are deployed and managed by a cloud platform and execute on top of a cloud infrastructure.

In such a services environment, messages or request/responses are issued among the various services. If one or more services has difficulty in providing a response in a reasonable amount of time, a retry request can be sent. However, in a system with dozens or hundreds of services, a small set of errors could trigger a disproportionate number of retry requests that will in turn decrease the overall efficiency of the computer system and may lead some tenants in a multi-tenant system to experience significant delays in response time due to an overburdened system due to a delayed response trigger multiple retry request from one tenant.

SUMMARY

Implementations of the present disclosure are directed to retrying calls between services in cloud-based systems. More particularly, implementations of the present disclosure are directed to a retry framework for retrying calls between services in cloud-based systems.

In some implementations, actions include receiving, at a first service, a first request including first header data including a flow identifier for a workflow and a first branch identifier, wherein the first branch identifier uniquely identifies a first branch of a workflow corresponding to the flow identifier, transmitting, from the first service and to a second service, a second request including second header data including the flow identifier and a second branch identifier, determining that the second request from the first service to the second service has failed, querying, by the first service, a retry history table using a first query including the flow identifier and the first branch identifier, and generating a first query result responsive to the first query by retrieving a first retry count from the retry history table, retrieving a threshold retry count, determining the first retry count is less than the threshold retry count so as to generate a first retry instruction, and incrementing the first retry count to provide a second retry count stored in the retry history table, transmitting the first query result comprising the first retry instruction, and retrying the second request from the first service to the second service so as to generate a retried second request in response to the first retry instruction in the first query result. Other implementations of this aspect include corresponding systems, apparatus, and computer programs, configured to perform the actions of the methods, encoded on computer storage devices.

These and other implementations can each optionally include one or more of the following features: querying by the first service the retry history further includes determining that the retry history table indicates absence of a record for the flow identifier and the first branch identifier, and in response, inserting a record for the first retry count into the retry history table indexed by the flow identifier and the first branch identifier, setting the first retry count for the record to an initial value, and the first retry count of first query response being the initial value; actions further include determining that the retried second request has failed, querying by the first service the retry history table using a second query comprising the flow identifier and the first branch identifier, generating a second query result responsive to the second query by retrieving the second retry count from the retry history table, retrieving the threshold retry count, and determining the second retry count is not less than the threshold retry count so as to generate an error message, and transmitting the second query result including the error message; the error is returned to one of a gateway and a third service; actions further include transmitting, from the first service to a third service, a third request including third header data including the flow identifier and a third branch identifier, wherein the first branch identifier is the same as the second branch identifier and third branch identifier is different from both the first and second branch identifiers, determining that the third request from the first service to the third service has failed, querying by the first service the retry history table using a second query including the flow identifier and the third branch identifier, generating a second query result responsive to the second query by retrieving a third retry count from the retry history table, retrieving a second threshold retry count, determining the third retry count is less than the second threshold retry count so as to generate a second retry instruction, and incrementing the third retry count to a fourth retry count stored in the retry history table, transmitting the second query response including the second retry instruction, and retrying the third request from the first service to the third service so as to generate a retried third request; actions further include determining that the retried third request has failed, querying by the first service the retry history table using a third query including the flow identifier and the third branch identifier, generating a third query result responsive to the third query by retrieving a fourth retry count from the retry history table, retrieving the second threshold retry count, and determining that the fourth retry count is not less than the second threshold retry count so as to generate an error message, and transmitting the third query response to the first service; the first request is transmitted from a third service to the first service; determining the second service has failed is based on exceeding a first timeout condition of the first service, the third service having a second timeout condition different from the first timeout condition; the first request is transmitted from a gateway to the first service; actions further include receiving a response from the first service to the gateway wherein the gateway instructs the retry history table to erase any entries with the flow identifier; and the flow identifier is generated by a gateway.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
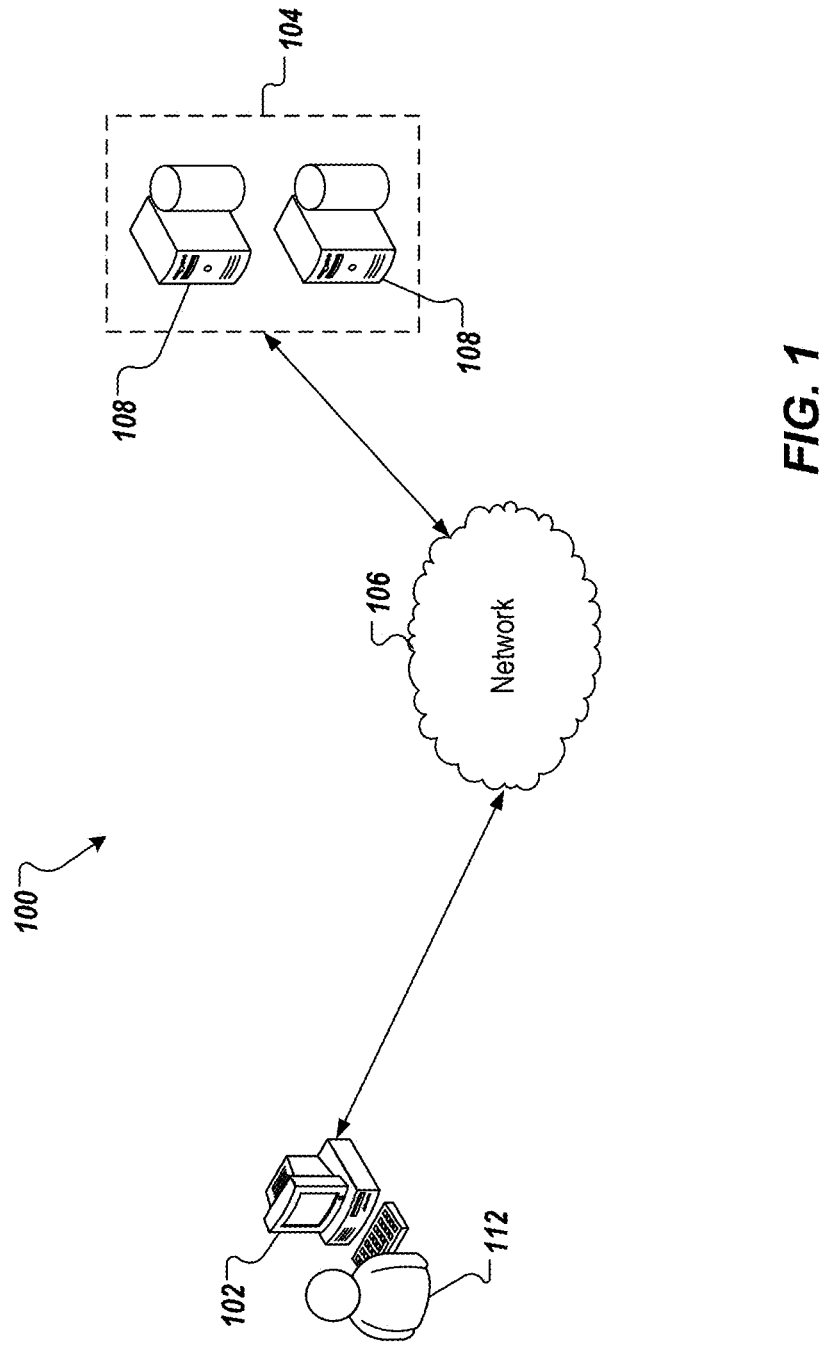
FIG. 1 depicts an example architecture that can be used to execute implementations of the present disclosure.

Implementations of the present disclosure are directed to retrying calls between services in cloud-based systems. More particularly, implementations of the present disclosure are directed to a retry framework for retrying calls between services in cloud-based systems. Implementations can include actions of receiving, at a first service, a first request including first header data including a flow identifier for a workflow and a first branch identifier, wherein the first branch identifier uniquely identifies a first branch of a workflow corresponding to the flow identifier, transmitting, from the first service and to a second service, a second request including second header data including the flow identifier and a second branch identifier, determining that the second request from the first service to the second service has failed, querying, by the first service, a retry history table using a first query including the flow identifier and the first branch identifier, and generating a first query result responsive to the first query by retrieving a first retry count from the retry history table, retrieving a threshold retry count, determining the first retry count is less than the threshold retry count so as to generate a first retry instruction, and incrementing the first retry count to provide a second retry count stored in the retry history table, transmitting the first query result comprising the first retry instruction, and retrying the second request from the first service to the second service so as to generate a retried second request in response to the first retry instruction in the first query result.

To provide further context for implementations of the present disclosure, and as introduced above, cloud computing can be described as Internet-based computing that pro-vides shared computer processing resources and data to computers and other devices on demand. Users can establish respective sessions, during which processing resources and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

Software applications can be provisioned using services, also referred to as microservices, which have gained popularity in service-oriented architectures (SOAs). In SOAs, applications are executed using multiple, independent services that are deployed in standalone containers with a well-defined interface. The services are deployed and managed by a cloud platform and execute on top of a cloud infrastructure. Services communicate with other services through remote calls, which can include using Representational State Transfer (REST) application programming interfaces (APIs) and remote procedure calls (RPC) (e.g., gRPC). In communications between services, unexpected errors (e.g., network error, timeout error) can arise. In response to an error, a retry strategy can be implemented in order to retry failed calls. However, the retry strategy is easy to abuse in the service, which results in waste of technical resources (e.g., processors, memory, bandwidth).

To illustrate such issues, a non-limiting example can be considered, in which an application includes a first service, a second service, a third service, and a fourth service, wherein each service provides different functionality or has access to different data sets. In this example, a transaction is requested for execution by the first service. For example, a request is received at a gateway to request that the application perform some task(s) and, in response, the first service can request that a transaction be executed by the second service by sending a request to the second service, the second service can request that a transaction be executed by the third service by sending a request to the third service, and the third service can request that a transaction be executed by the fourth service by sending a request to the fourth service. Accordingly, in this example, a workflow is executed across four services (e.g., SRV1→SRV2→SRV3→SRV4) by remote call. In this example, each service will retry a remote call a maximum of three times in response to an error (e.g., the maximum number of calls of each service is four including the first call). If there is some problem in the system, a scenario as represented in Table 1 can occur:

TABLE 1

| Example Error and Retries | | |
| --- | --- | --- |
| Request No | Remote call | Incident |
| REQ1 | Gateway → SRV1 → SRV2 → SRV3 → SRV4 | |
| REQ2 | SRV3 → SRV4 | SRV3 receives error for REQ1 from SRV4 and retries for REQ1 for first time |
| REQ3 | SRV2 → SRV3 SRV4 | SRV2 receives error for REQ1 from SRV3 and retries for REQ1 for first time |
| REQ4 | SRV1 → SRV2 → SRV3 → SRV4 | SRV1 receives error for REQ1 from SRV2 and retries for REQ1 for first time |
| REQ5 | SRV3 → SRV4 | SRV3 receives error for REQ2 from SRV4 and retries for REQ2 for second time |

5

TABLE 1-continued

Example Error and Retries

| Request No | Remote call | Incident |
|---|---|---|
| REQ6 | SRV3 → SRV4 | SRV3 receives error for REQ3 from SRV4 and retries for REQ3 for first time |
| REQ7 | SRV3 → SRV4 | SRV3 receives error for REQ4 from SRV4 and retries for REQ4 for first time |
| REQ8 | SRV2 → SRV3 → SRV4 | SRV2 receives error for REQ3 from SRV3 and retries for REQ3 for second time |
| REQ9 | SRV1 → SRV2 → SRV3 → SRV4 | SRV1 receives error for REQ4 from SRV2 and retries for REQ4 for second time |
| REQ10 | SRV3 → SRV4 | SRV3 receives error for REQ5 from SRV4 and retries for REQ5 for third time |
| REQ11 | SRV3 → SRV4 | SRV3 receives error for REQ6 from SRV4 and retries for REQ6 for second time |
| REQ12 | SRV3 → SRV4 | SRV3 receives error for REQ7 from SRV4 and retries for REQ7 for second time |
| REQ13 | SRV3 → SRV4 | SRV3 receives error for REQ8 from SRV4 and retries for REQ8 for first time |
| REQ14 | SRV3 → SRV4 | SRV3 receives error for REQ9 from SRV4 and retries for REQ9 for first time |
| REQ15 | SRV2 → SRV3 → SRV4 | SRV2 receives error for REQ3 from SRV3 and retries for REQ3 for second time |
| REQ16 | SRV2 → SRV3 → SRV4 | SRV2 receives error for REQ4 from SRV3 and retries for REQ4 for first time |
| REQ17 | SRV1 → SRV2 → SRV3 → SRV4 | SRV1 receives error for REQ4 from SRV2 and retries for REQ4 for third time |
| . . . | . . . | . . . |

In the scenario represented in Table 1, the total retries triggered is 4×4×4=64, which consumes significant technical resources and can result in hanging of the whole system.

In view of the above context, implementations of the present disclosure provide a retry framework for executing retries in SOAs. In some implementations, the retry framework includes adding header(s) or additional data to an existing header to calls in a workflow and using a retry history (RETRY_HISTORY) table to record retries between services. More particularly, and as described in further detail herein, each call between services includes header(s) or additional data in a header to uniquely identify a workflow that the call (request to another service) belongs to and to uniquely identify a branch of the workflow. In some implementations, if a service is to retry a call, the service queries the RETRY_HISTORY table to determine a number of times the call has been retried, if any. If the call has not been retried, or has been retried less than a threshold number of times, the service updates the RETRY_HISTORY table and executes the retry. If the call has been retried at least the threshold number of times, the service returns an error.

Implementations of the present disclosure are described in further detail herein with reference to the hypertext transfer protocol (HTTP). It is contemplated, however, that implementations of the present disclosure can be realized using any appropriate protocols.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some examples, the server system 104 can host one or more cloud-based applications that execute functionality. In some examples, a cloud-based application can execute functionality in response to requests received from any appropriate source (e.g., users, software systems). For example, a cloud-based application can execute functionality in response to the user 112, which submits a request to the cloud-based application through the client device 102.

In some implementations, the server system 104 can host multiple services that for cloud-based applications. For example, workflows can be executed across services, in which services issue requests to other services through remote calls where the services that receive those requests provide responses back to the requesting service. In accordance with implementations of the present disclosure, and as described in further detail herein, the server system 104 provides a retry framework for tracking retries between services based on workflows and branches within workflows.

As introduced above, header(s) or additional header data are added to calls between services. Table 2 provides example headers:

TABLE 2

Example Headers

| Header | Remark |
|---|---|
| flow_id | A unique identifier (ID) for a respective workflow. |
| branch_id | A unique ID for each branch of a workflow. |

In some implementations, a workflow is initiated by a gateway receiving a request from an application or a user. In response to the request, the gateway generates the flow_id header, which is passed to the services. In general, each workflow initiated by the gateway is assigned a unique flow_ID_Each service passes the flow_id header to subsequent services in execution of the workflow. In some implementations, the gateway generates the first branch_id and each service passes the first branch_id to subsequent services. In the same branch, if one service does a remote call multiple times, that service will generate a new branch_id, as described in further detail herein.

Figures 2A, 2B:
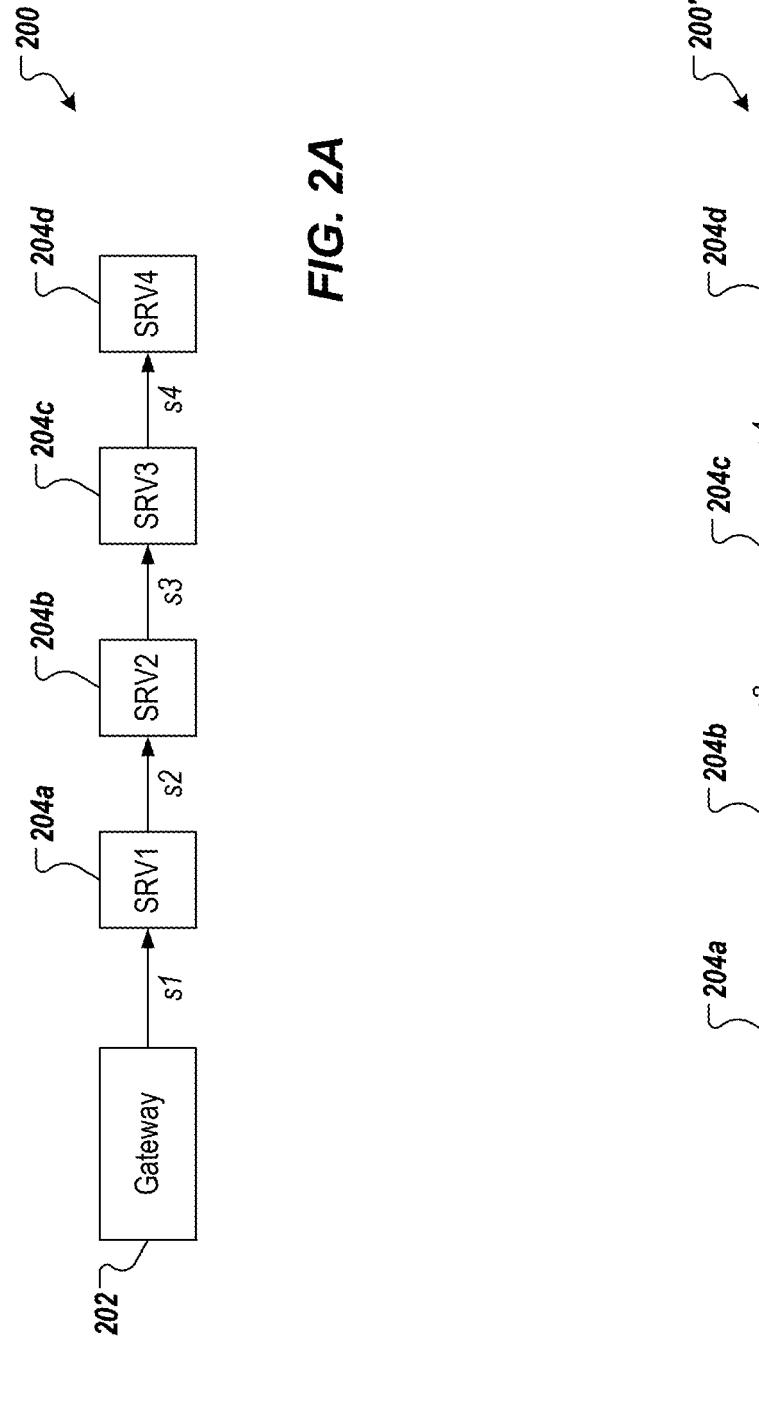
FIGS. 2A-2C depict example workflows in accordance with implementations of the present disclosure.
Figure 2C:
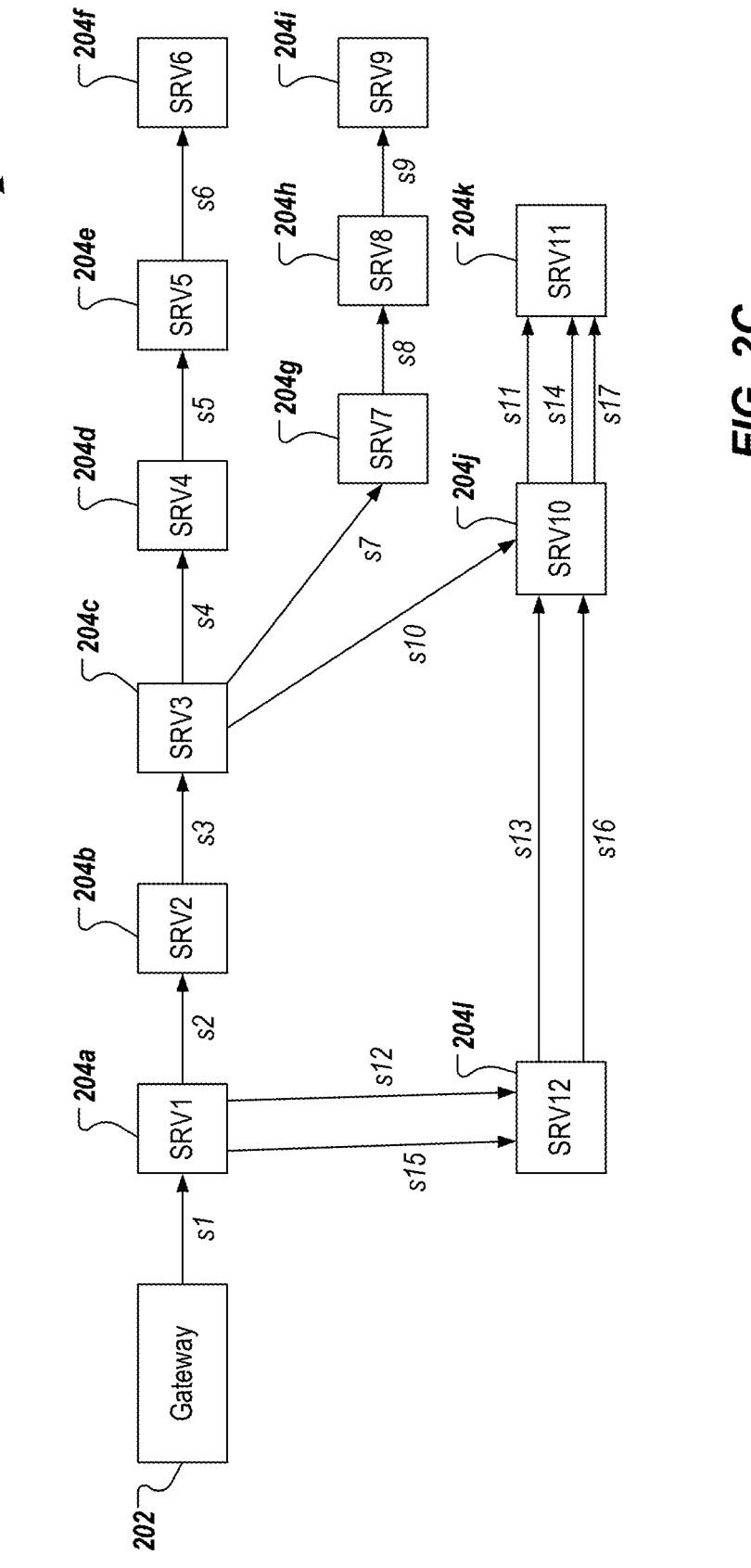

FIGS. 2A-2C depict example workflows in accordance with implementations of the present disclosure. Implementations of the present disclosure are described in further detail herein with reference to the example workflows of FIGS. 2A-2C. It is contemplated, however, that implementations of the present disclosure can be realized using any appropriate workflows. It should be noted that FIGS. 2A-2C show requests flowing from a gateway to multiple services in a downstream fashion. Those downstream services may also provide responses (e.g., a result of an operation; data retrieved from a database, etc.) back to the upstream requesting service or gateway (the responses are not shown in FIGS. 2A-2C for clarity reasons). In this manner, a computer system can execute many operations to achieve specific objectives.

With particular reference to FIG. 2A, an example workflow 200 includes a gateway 202 and services 204a, 204b, 204c, 204d. In some examples, the gateway 202 receives a request from an application and, in response, initiates execution of the workflow 200 across the services 204a, 204b, 204c, 204d. In the examples of FIG. 2A, the gateway generates header data such as flow_id and branch_id sends a request (s1) that includes the header data to the service 204a, the service 204a sends a request (s2) that includes the header data to the service 204b, the service 204b sends a request (s3) that includes the header data to the service 204c, and the service 204c sends a request (s4) that includes the header data to the service 204d. In this example, the flow_id and the branch_id for each request is as provided in Table 3:

TABLE 3

| Example Workflow with Call Headers | | | |
| --- | --- | --- | --- |
| Request | Remote Call | flow_id | branch_id |
| s1 | Gateway → SRV1 | 71837000-fe40-ea62-fd31 | aaaaaaaaa |
| s2 | SRV1 → SRV2 | 71837000-fe40-ea62-fd31 | aaaaaaaaa |
| s3 | SRV2 → SRV3 | 71837000-fe40-ea62-fd31 | aaaaaaaaa |
| s4 | SRV3 → SRV4 | 71837000-fe40-ea62-fd31 | aaaaaaaaa |

In the example of FIG. 2A and Table 3, the gateway 202 generates the flow_id (71837000-fe40-ea62-fd31) and the branch_id (aaaaaaaaa), which are passed in one or more headers between services. The example of FIG. 2A represents a workflow, in which only a single branch is provided.

With particular reference to FIG. 2B, an example workflow 200' includes the gateway 202 and the services 204a, 204b, 204c, 204d. In this example, the gateway 202 receives a request from an application and, in response, initiates execution of the workflow 200' across the services 204a, 204b, 204c, 204d. In the example of FIG. 2B, the gateway generates header data and sends a request (s1) to the service 204a that includes the generated header data, the service 204a sends a request (s2) that includes the header data to the service 204b, the service 204b sends a request (s3) that includes the header data to the service 204c, and the service 204c sends a request (s4) that includes the header data to the service 204d. Further, the service 204b generates modified header data and sends a request (s5) to the service 204c that includes the modified header data, and the service 204c sends a request (s6) that includes the modified header data to the service 204d, and the service 204b generates different modified header data and sends a request (s7) that includes the different modified header data to the service 204c, and the service 204c sends a request (s8) that includes the different modified header data to the service 204d. In this example, the flow_id and the branch_id for each request is as provided in Table 4:

TABLE 4

| Example Workflow with Call Headers | | | |
| --- | --- | --- | --- |
| Request | Remote Call | flow_id | branch_id |
| s1 | Gateway → SRV1 | 71837000-fe40-ea62-fd31 | aaaaaaaaa |
| s2 | SRV1 → SRV2 | 71837000-fe40-ea62-fd31 | aaaaaaaaa |
| s3 | SRV2 → SRV3 | 71837000-fe40-ea62-fd31 | aaaaaaaaa |
| s4 | SRV3 → SRV4 | 71837000-fe40-ea62-fd31 | aaaaaaaaa |
| s5 | SRV2 → SRV3 | 71837000-fe40-ea62-fd31 | bbbbbbbb |
| s6 | SRV3 → SRV4 | 71837000-fe40-ea62-fd31 | bbbbbbbb |
| s7 | SRV2 → SRV3 | 71837000-fe40-ea62-fd31 | ccccccccc |
| s8 | SRV3 → SRV4 | 71837000-fe40-ea62-fd31 | ccccccccc |

The example of FIG. 2B and Table 4 includes three branches as a result of the workflow 200' including services that make multiple calls to other services. In this example, the service 204b makes multiple calls to the service 204c, which makes respective multiple calls to the service 204d. At the start of the workflow 200', the gateway 202 generates the flow_id (71837000-fe40-ea62-fd31) and the branch_id (aaaaaaaaa). For the request (s5), the service 204b adds a new branch_id (bbbbbbbb) and, for the request (s7), the service 204b adds a new branch_id (ccccccccc).

As previously described, the gateway 202 generates the initial flow_id and the initial branch_id. The gateway 202 generates unique flow_ids, one for each user request it receives that the gateway forwards to one or more services. While FIG. 2B shows only one request (s1) from gateway 202 to service 204a, other implementations may have gateway 202 issuing multiple requests. For example, if two different users issue two different requests to gateway 202, gateway 202 will generate two different flow_ids, one for each request. The initial branch_ids associated with each of those flow_ids may be identical or not. In addition, the initial request from the user to gateway 202 may require gateway 202 to issue two or more requests to services from a single received user request. Thus, a single user request may cause gateway 202 to issue one request to service 204a (s1) using one flow_id and one branch_id as header data, and a second request to a different service, SRVx not shown (sx) where the flow_ids would be the same, as they arise from the same initial user request, but the branch_ids would be different for (s1) and (sx).

While gateway 202 has the ability to generate different flow_ids and branch_ids as necessary, the downstream services cannot generate new flow_ids, but can generate new branch_ids as needed. This follows from what is shown in FIG. 2B and Table 4 where a single user request to gateway 202 initiated an entire workflow using requests (s1)-(s8) using one flow_id but multiple branch_ids. In one embodiment, downstream services will generate unique branch_ids associated with only one flow_id. This is to avoid a collision where there are two or more branches in one workflow, but each branch should be managed individually and thus have a different branch_id from the other branches in the same workflow. One way to achieve this is to have each service provide a unique portion of data associated with only that service to each branch_id it generates. As an example, if each service is given its own unique ID, such as SRVx where x is a unique number in the computer system, each branch_id a service could create may begin with that identifier as a prefix and allowing the remaining portion of the branch_id to be generated otherwise (e.g., randomly or some other scheme). Thus, a branch_id could be SRV2bbbb added as header data to request (s5).

With particular reference to FIG. 2C, an example workflow 200″ includes the gateway 202, the services 204a, 204b, 204c, 204d, and services 204e, 204f, 204g, 204h, 204i, 204j, 204k, 204l. In this example, the gateway 202 receives a request from an application and, in response, initiates execution of the workflow 200″ across the services 204a, 204b, 204c, 204d, 204e, 204f, 204g, 204h, 204i, 204j, 204k, 204l. In the example of FIG. 2C, the gateway sends a request (s1) to the service 204a, the service 204a sends a request (s2) to the service 204b, the service 204b sends a request (s3) to the service 204c, and the service 204c sends a request (s4) to the service 204d. Further, the service 204d sends a request (s5) to the service 204e, the service 204e sends a request (s6) to the service 204f, the service 204c sends a request (s7) to the service 204g, the service 204g sends a request (s8) to the service 204h, the service 204h sends a request (s9) to the service 204i, the service 204c sends a request (s10) to the service 204j, the service 204j sends a request (s11) to the service 204k, the service 204a sends a request (s12) to the service 204l, the service 204l sends a request (s13) to the service 204j, the service 204j sends a request (s14) to the service 204k, the service 204a sends a request (s15) to the service 204l, the service 204l sends a request (s16) to the service 204j, and the service 204j sends a request (s17) to the service 204k. In this example, the flow_id and the branch_id for each request is as provided in Table 5:

TABLE 5

Example Workflow with Call Headers

| Request | Remote call | flow_id | branch_id |
|---------|-------------|---------|-----------|
| s1 | Gateway → SRV1 | 71837000-fe40-ea62-fd31 | aaaaaaaaa |
| s2 | SRV1 → SRV2 | 71837000-fe40-ea62-fd31 | aaaaaaaaa |
| s3 | SRV2 → SRV3 | 71837000-fe40-ea62-fd31 | aaaaaaaaa |
| s4 | SRV3 → SRV4 | 71837000-fe40-ea62-fd31 | aaaaaaaaa |
| s5 | SRV4 → SRV5 | 71837000-fe40-ea62-fd31 | aaaaaaaaa |
| s6 | SRV5 → SRV6 | 71837000-fe40-ea62-fd31 | aaaaaaaaa |
| s7 | SRV3 → SRV7 | 71837000-fe40-ea62-fd31 | bbbbbbbb |
| s8 | SRV7 → SRV8 | 71837000-fe40-ea62-fd31 | bbbbbbbb |
| s9 | SRV8 → SRV9 | 71837000-fe40-ea62-fd31 | bbbbbbbb |
| s10 | SRV3 → SRV10 | 71837000-fe40-ea62-fd31 | cccccccccc |
| s11 | SRV10 → SRV11 | 71837000-fe40-ea62-fd31 | cccccccccc |
| s12 | SRV1 → SRV12 | 71837000-fe40-ea62-fd31 | dddddddd |
| s13 | SRV12 → SRV10 | 71837000-fe40-ea62-fd31 | dddddddd |
| s14 | SRV10 → SRV11 | 71837000-fe40-ea62-fd31 | dddddddd |
| s15 | SRV1→ SRV12 | 71837000-fe40-ea62-fd31 | eeeeeeee |
| s16 | SRV12 → SRV10 | 71837000-fe40-ea62-fd31 | eeeeeeee |
| s17 | SRV10 → SRV11 | 71837000-fe40-ea62-fd31 | eeeeeeee |

The example of FIG. 2C and Table 5 includes five branches as a result of the workflow 200″ including services that make multiple calls to other services. In this example, the service 204c makes a call to the services 204d, 204g, 204j, which make respective calls to other services, and the service 204a makes multiple calls to the service 204l, which makes respective calls to the service 204j. At the start of the workflow 200″, the gateway 202 generates the flow_id (71837000-fe40-ea62-fd31) and the branch_id (aaaaaaaaa). In this example, for the request (s7), the service 204c adds a new branch_id (bbbbbbbb), for the request (s10), the service 204c adds a new branch_id (cccccccccc), for the request (s12), the service 204a adds a new branch_id (dddddddd), and, for the request (s15), the service 204a adds a new branch_id (eeeeeeee).

As introduced above, the retry framework of the present disclosure includes the RETRY_HISTORY table. Table 6 provides an example of the RETRY_HISTORY table:

TABLE 6

Example RETRY_HISTORY Table

| Column Name | Column Type | Is Key | Remark |
|-------------|-------------|--------|--------|
| FLOW_ID | String | Yes | The flow_id of the current workflow |
| BRANCH_ID | String | Yes | The branch_id of the current branch |
| RETRIES | Integer | No | The retry times of the current branch |
| MAX_RETRIES | Integer | No | Maximum number of allowed retries |

In some implementations, the RETRY_HISTORY table is stored in a central database system that is accessible to and can be queried by the gateway and each of the services. Further, a maximum number of retries (e.g., an integer constant) MAX_RETRIES ($r_{MAX}$) is provided and defines the maximum number of times that the same branch can retry at a global level. An example value for MAX_RETRIES ($r_{MAX}$) is three. It is contemplated, however, that any appropriate value can be used. It is also contemplated that different workflows and branch combinations, in the same workflow or across different workflows, could have different MAX_RETRIES ($r_{MAX}$) values.

In accordance with implementations of the present disclosure, if a service is to retry a remote call to another service, the service queries the RETRY_HISTORY table for retry count ($r_{CNT}$) and MAX_RETRIES ($r_{MAX}$) for the respective branch using the following example query (Query 1):

SELECT RETRIES, MAX_RETRIES FROM RETRY_HISTORY t WHERE t. FLOW_ID=#flow_id # and t. BRANCH_ID=#brach_id #

The first column of query result is $r_{CNT}$ and the second column is $r_{MAX}$. For example, and with reference to the workflow 200″ of FIG. 2C, it can be determined that an error occurred with respect to the request (s6) (e.g., the service 204f timed-out in handling the request (s6)). In response, the service 204e can determine whether to retry the request by querying the RETRY_HISTORY table using the keys [71837000-fe40-ea62-fd31, aaaaaaaaa]. In some examples, if the returned result is empty, a request on the branch has not been retried. That is, there is no retry record for the branch in the RETRY_HISTORY table. The service or database can insert a new record in the RETRY_HISTORY table by executing the following example query (Query 2):

INSERT INTO RETRY_HISTORY (FLOW_ID, BRANCH_ID, RETRIES, MAX_RETRIES) VALUES (#flow_id #, #brach_id #, 1, #MAX_RETRIES #)

For example, and with continued reference to FIG. 2C, it can be determined that no retry has occurred for the branch aaaaaaaaa in the workflow 71837000-fe40-ea62-fd31 (e.g., the result to Query 1 by the service 204e is empty). In response, the service (if the database does not do so automatically) 204e can insert a record for [71837000-fe40-ea62-fd31, aaaaaaaaa] with a value of 1 (e.g., indicating first retry) for column RETRIES and an appropriate $r_{MAX}$ value for column MAX_RETRIES. The $r_{MAX}$ value can be determined by an administrator for different workflows and branches. After inserting the record, the service retries the request. However, it can occur that the insert operation may fail (e.g., as a result of another record being inserted during the time gap between query operation (Query 1) and insert operation (Query 2)). In such a case, the service retries Query 1 and rechecks the result.

If the result of Query 1 is not empty, the result ($r_{CNT}$) is compared to MAX_RETRIES ($r_{MAX}$). If the result is less than MAX_RETRIES ($r_{MAX}$), the service can update the record in the RETRY_HISTORY table by executing the following example query (Query 3):

UPDATE RETRY_HISTORY SET RETRIES= RETRIES+1 WHERE t. FLOW_ID=#flow_id # and t. BRANCH_ID=#brach_id #

After updating the record, the service retries the request. If the result is equal to or greater than MAX_RETRIES ($r_{MAX}$), the service cannot retry that request and, instead, returns an error result.

Figure 3:
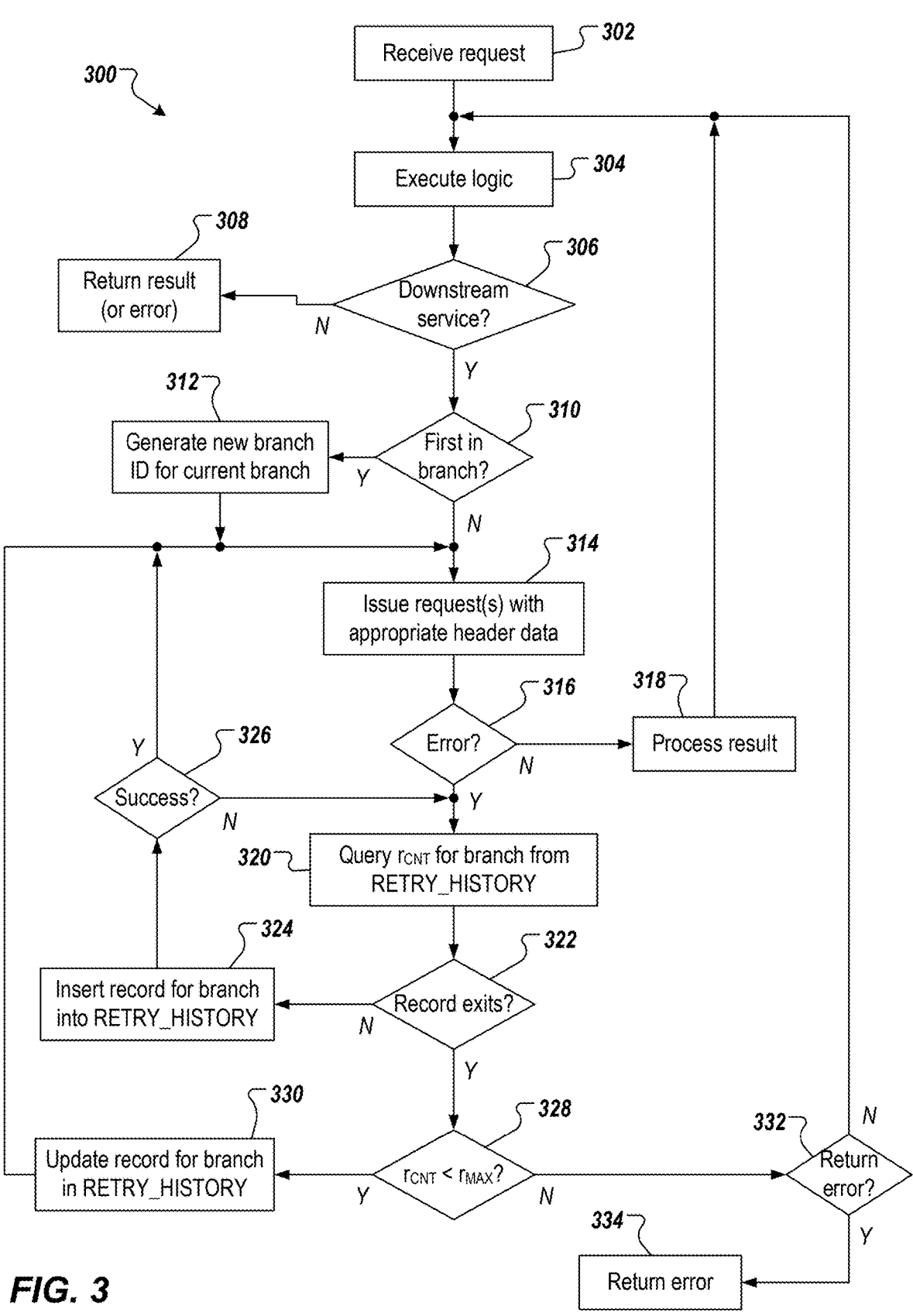
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. In some examples, the example process 300 is executed by a service that is to retry a request (remote call) to another service as well as providing information to potential downstream services. The retry request can be, for example, in response to an error condition. To illustrate the example process 300, non-limiting reference is made to the example of FIG. 2C and Table 5, and to the services 204b, 204c and 204f, in particular. In this example, it can be determined that there is an error for the request (s7) (e.g., timeout error).

FIG. 3 begins when a service, such as the service 204c, receives a request either from upstream (such as gateway 202, or as shown in FIG. 2C, another service such as service 204b) (302). Upon receiving request (s3), the service 204c begins to process some logic (304) and it is determined whether downstream services will be called upon to further process the received request (306). If no downstream service(s) will be required, as an example, a result (or error if it occurs) is returned (308).

If downstream service(s) will be called (306), it is determined whether it is the first time to call the downstream services in the current branch (310). If it is determined that it is the first time to call downstream services in the current branch, the header data received with the request is inserted into a downstream request and the downstream request is issued (314). For example, in issuing the request (s3), the service 204b copies the received header data into the request (s3). Referring to Table 5, the service 20b received upstream request (s2) previously and copies the received header data (71837000-fe40-ea62-fd31, aaaaaaaa) into the request (s3) (71837000-fe40-ea62-fd31, aaaaaaaa). It is determined whether an error has been received (316).

If it is not the first time to call downstream services (310), the service will generate a new branch ID as current branch ID (312). For example, if the service 204c calling downstream services not for the first time, a new branch_id is set as a current branch ID.

For example, and referring to Table 5, the service 204c issues three requests. In the first time, it copies the header data from the received request. That is, the header data received by the service 204c ((s3) has header data 71837000-fe40-ea62-fd31, aaaaaaaa). In the second and third times, it generates two new branch IDs (312). In the second time, the service 204c generates downstream request (s7) with header data 71837000-fe40-ea62-fd31, bbbbbbbb (312), issues the downstream requests s7 (314). In the third time, service 204c generates downstream request (s10) with header data 71837000-fe40-ea62-fd31, cccccccc (312), the service 204c issues the downstream request s10 (314). For every remote call at (314), it is determined whether an error is received (316). If no error is received, the response result from the downstream service is process (318) and the example process 300 loops back.

If an error is received, a $r_{CNT}$ and $r_{MAX}$ for a branch is queried from the RETRY_HISTORY table (320). For example, and as described herein, the service 204c can submit a query (Query 1) to the database system to determine the $r_{CNT}$ and $r_{MAX}$ for the branch of the workflow 200''. In this example, the query can include [71837000-fe40-ea62-fd31, bbbbbbbb] as the index to the RETRY_HISTORY table.

It is determined whether a record exists (322). For example, and as described herein, the database that maintains the RETRY_HISTORY table can return a result to the query, the result indicating whether a record for [flow_id, branch_id] exists and, if a record does exist, values of $r_{CNT}$ and $r_{MAX}$. For example, and assuming that a retry had not been previously executed for the branch bbbbbbbb, the database system returns a result indicating that no record exists for [71837000-fe40-ea62-fd31, bbbbbbbb]. As another example, and assuming that at least one retry had been previously executed for the branch bbbbbbbb, the database system returns a result including $r_{CNT}$ for [71837000-fe40-ea62-fd31, bbbbbbbb].

If a record does not exist, a record is inserted for the branch into the RETRY_HISTORY table (324). For example, and as described herein, the service 204c can execute an insert operation (Query 2) to insert a record for [71837000-fe40-ea62-fd31, bbbbbbbb] with $r_{CNT}$ equal to 1 and an appropriate $r_{MAX}$ value as determined by an administrator. It is determined whether the insert operation was successful (326). If the insert operation was not successful, the example process 300 loops back (320). If the insert operation is successful, the retry is executed (314). For example, the service 204c retries the call, the request (s7), to the service 204g.

If a record does exist, it is determined whether $r_{CNT}$ is less than $r_{MAX}$ (328). It For example, and as described herein, $r_{CNT}$ and $r_{MAX}$ for [71837000-fe40-ea62-fd31, bbbbbbbb] are returned to the service 204c, which compares $r_{CNT}$ to $r_{MAX}$. If rex is not less than $r_{MAX}$, it is determined whether to throw the received error (332). For example, different services have different methods to process errors. Some services may ignore the error, use some default fallback result to replace error. In such instances, the example process 300 loops back. In some instances, if the service has performed retries and the error persists, and the service does not have a default fallback to replace the error, the error is returned (334).

Some services may throw error to the upstream directly (308), and this type of process usually cause the upstream perform a retry. For example, and as described herein, the service 204c returns an error message to the service 204b (the service 204b had called the service 204c for the request (s2)) (316). If $r_{CNT}$ is less than $r_{MAX}$, the record for the branch is updated in the RETRY_HISTORY table (316) and the retry is executed (314). For example, and as described herein, $r_{CNT}$ for [71837000-fe40-ea62-fd31, bbbbbbbb] is incremented and the service 204c retries the call, the request (s7) to the service 204g.

Alternative implementations of the process 300 shown in FIG. 3 are also within the scope of this description. For example, a processor associated with the RETRY_HISTORY table could execute some of the above stages described previously. When a query is received by RETRY_HISTORY table at (320), the associated logic could query the table for the values of $r_{CNT}$ and $r_{MAX}$ and execute the comparison at (322) centrally. The response to the initial query (320) from RETRY_HISTORY table and its associated processor would be an instruction to the querying service that no additional retry attempts are permitted and error needs to be issued (332) or that additional retry attempts are permitted (314).

It can be noted that, in the case of multiple remote calls to downstream service(s), the multiple calls can be done synchronously, asynchronously, or in a hybrid approach (e.g., some calls sent synchronously, some calls sent asynchronously. In the case of the synchronous approach, after sending the first request, a response to the first request is waited for, is processed when received, a next request is sent, and so on, all actions being serial. FIG. 3 generally represents the synchronous approach. In the asynchronous approach, multiple requests can be sent at the same time, and multiple responses can be processed at the same time, all actions are parallel. In the hybrid approach, some requests are processed serially and some requests are processed in parallel.

Implementations of the present disclosure achieve one or more technical improvements. For example, the present disclosure selectively issues errors at the branch level. As such, the number of retry attempts is evaluated for each branch of a workflow, as opposed to each service (service level). In this manner, multiple retries of each service along a branch is avoided, thereby conserving technical resources (e.g., processors, memory, bandwidth). In some examples, the number of retries for each branch cannot be greater than $r_{MAX}$, and can include multiple variants. An example variant can include limiting a total number of retries for the entire workflow (all branches) to $r_{MAX}$. Another example variant can include limiting a number of retries of each service to $r_{MAX}$. Another example variant can include limiting a number of retries of sets of multiple services to $r_{MAX}$.

Figure 4:
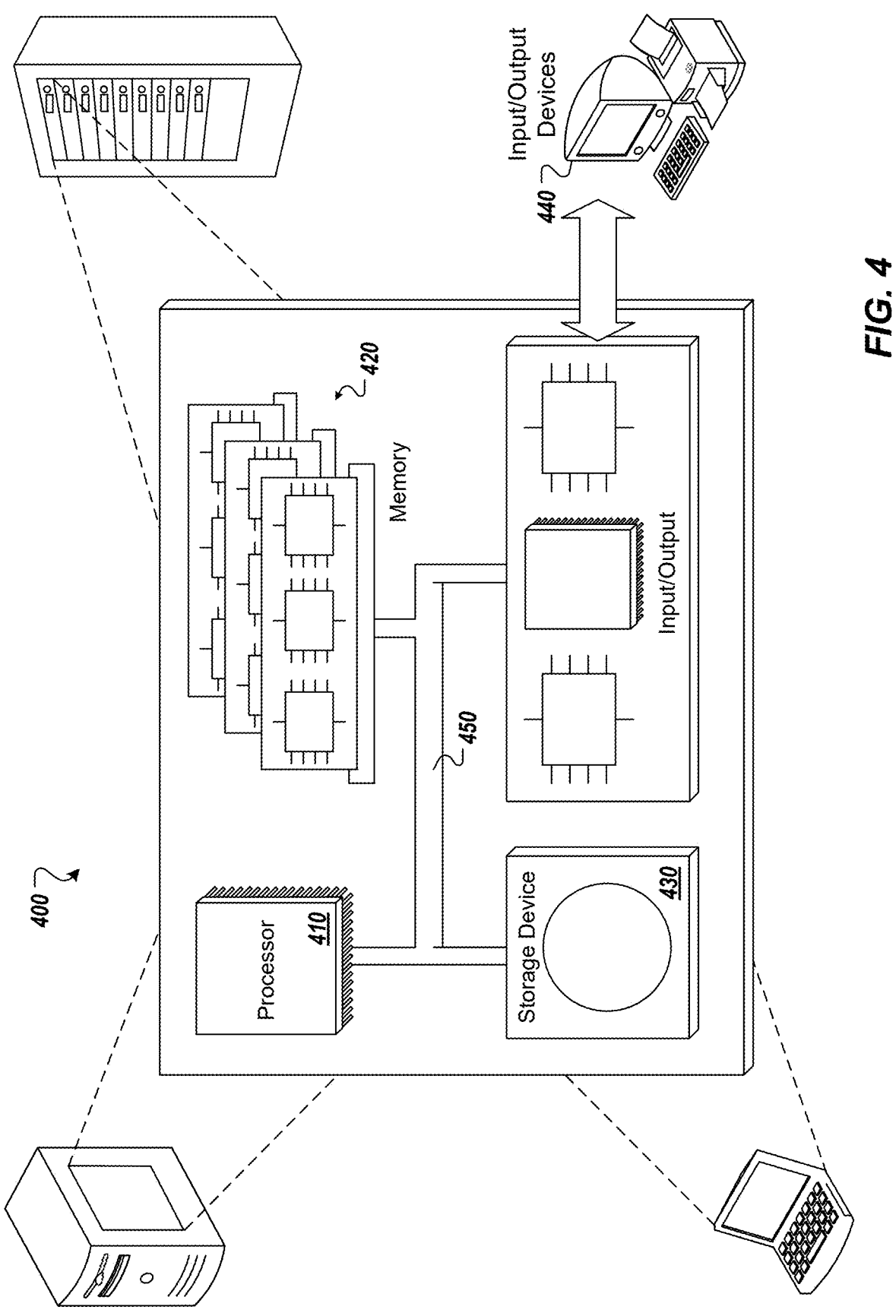
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for retrying requests between services in cloud computing systems, the method being executed by one or more processors and comprising:

receiving, at a first service, a first request comprising first header data including a flow identifier for a workflow and a first branch identifier, wherein the first branch identifier uniquely identifies a first branch of a workflow corresponding to the flow identifier;

transmitting, from the first service and to a second service, a second request comprising second header data including the flow identifier and a second branch identifier;

determining that the second request from the first service to the second service has failed;

querying, by the first service, a retry history table using a first query comprising the flow identifier and the first branch identifier; and generating a first query result responsive to the first query by:

retrieving a first retry count from the retry history table, retrieving a threshold retry count, determining the first retry count is less than the threshold retry count so as to generate a first retry instruction, and incrementing the first retry count to provide a second retry count stored in the retry history table;

transmitting the first query result comprising the first retry instruction; and retrying the second request from the first service to the second service so as to generate a retried second request in response to the first retry instruction in the first query result.

2. The method of claim 1, wherein the querying by the first service the retry history further comprises:

determining that the retry history table indicates absence of a record for the flow identifier and the first branch identifier, and in response:

inserting a record for the first retry count into the retry history table indexed by the flow identifier and the first branch identifier;

setting the first retry count for the record to an initial value; and wherein the first retry count of first query response is the initial value.

3. The method of claim 1, further comprising:

determining that the retried second request has failed;

querying by the first service the retry history table using a second query comprising the flow identifier and the first branch identifier;

generating a second query result responsive to the second query by:

retrieving the second retry count from the retry history table, retrieving the threshold retry count, and determining the second retry count is not less than the threshold retry count so as to generate an error message; and transmitting the second query result comprising the error message.

4. The method of claim 3, wherein the error is returned to one of a gateway and a third service.

5. The method of claim 1, further comprising:

transmitting, from the first service to a third service, a third request comprising third header data including the flow identifier and a third branch identifier, wherein the first branch identifier is the same as the second branch identifier and third branch identifier is different from both the first and second branch identifiers;

determining that the third request from the first service to the third service has failed;

querying by the first service the retry history table using a second query comprising the flow identifier and the third branch identifier;

generating a second query result responsive to the second query by:

retrieving a third retry count from the retry history table, retrieving a second threshold retry count, determining the third retry count is less than the second threshold retry count so as to generate a second retry instruction, and incrementing the third retry count to a fourth retry count stored in the retry history table;

transmitting the second query response comprising the second retry instruction; and retrying the third request from the first service to the third service so as to generate a retried third request.

6. The method of claim 5, further comprising:

determining that the retried third request has failed;

querying by the first service the retry history table using a third query comprising the flow identifier and the third branch identifier;

generating a third query result responsive to the third query by:

retrieving a fourth retry count from the retry history table, retrieving the second threshold retry count, and determining that the fourth retry count is not less than the second threshold retry count so as to generate an error message; and transmitting the third query response to the first service.

7. The method of claim 1, wherein the first request is transmitted from a third service to the first service.

8. The method of claim 7, wherein determining the second service has failed is based on exceeding a first timeout condition of the first service, the third service having a second timeout condition different from the first timeout condition.

9. The method of claim 1, wherein the first request is transmitted from a gateway to the first service.

10. The method of claim 9, further comprising receiving a response from the first service to the gateway wherein the gateway instructs the retry history table to erase any entries with the flow identifier.

11. The method of claim 1, wherein the flow identifier is generated by a gateway.

12. A non-transitory computer-readable storage medium coupled to one or more processors and having instructions stored thereon which, when executed by the one or more processors, cause the one or more processors to perform operations for retrying requests between services in cloud computing systems, the operations comprising:

receiving, at a first service, a first request comprising first header data including a flow identifier for a workflow and a first branch identifier, wherein the first branch identifier uniquely identifies a first branch of a workflow corresponding to the flow identifier;

transmitting, from the first service and to a second service, a second request comprising second header data including the flow identifier and a second branch identifier;

determining that the second request from the first service to the second service has failed;

querying, by the first service, a retry history table using a first query comprising the flow identifier and the first branch identifier; and generating a first query result responsive to the first query by:

retrieving a first retry count from the retry history table, retrieving a threshold retry count, determining the first retry count is less than the threshold retry count so as to generate a first retry instruction, incrementing the first retry count to provide a second retry count stored in the retry history table;

transmitting the first query result comprising the first retry instruction; and retrying the second request from the first service to the second service so as to generate a retried second request in response to the first retry instruction in the first query result.

13. The non-transitory computer-readable storage medium of claim 12, wherein the querying by the first service the retry history further comprises:

determining that the retry history table indicates absence of a record for the flow identifier and the first branch identifier, and in response:

inserting a record for the first retry count into the retry history table indexed by the flow identifier and the first branch identifier;

setting the first retry count for the record to an initial value; and wherein the first retry count of first query response is the initial value.

14. The non-transitory computer-readable storage medium of claim 12, wherein operations further comprise:

determining that the retried second request has failed;

querying by the first service the retry history table using a second query comprising the flow identifier and the first branch identifier;

generating a second query result responsive to the second query by:

retrieving the second retry count from the retry history table, retrieving the threshold retry count, and determining the second retry count is not less than the threshold retry count so as to generate an error message; and transmitting the second query result comprising the error message.

15. The non-transitory computer-readable storage medium of claim 14, wherein the error is returned to one of a gateway and a third service.

16. The non-transitory computer-readable storage medium of claim 12, wherein operations further comprise:

transmitting, from the first service to a third service, a third request comprising third header data including the flow identifier and a third branch identifier, wherein the first branch identifier is the same as the second branch identifier and third branch identifier is different from both the first and second branch identifiers;

determining that the third request from the first service to the third service has failed;

querying by the first service the retry history table using a second query comprising the flow identifier and the third branch identifier;

generating a second query result responsive to the second query by:

retrieving a third retry count from the retry history table, retrieving a second threshold retry count, determining the third retry count is less than the second threshold retry count so as to generate a second retry instruction, and incrementing the third retry count to a fourth retry count stored in the retry history table;

transmitting the second query response comprising the second retry instruction; and retrying the third request from the first service to the third service so as to generate a retried third request.

17. A system, comprising:

a computing device; and a computer-readable storage device coupled to the computing device and having instructions stored thereon which, when executed by the computing device, cause the computing device to perform operations for retrying requests between services in cloud computing systems, the operations comprising:

receiving, at a first service, a first request comprising first header data including a flow identifier for a workflow and a first branch identifier, wherein the first branch identifier uniquely identifies a first branch of a workflow corresponding to the flow identifier;

transmitting, from the first service and to a second service, a second request comprising second header data including the flow identifier and a second branch identifier;

determining that the second request from the first service to the second service has failed;

querying, by the first service, a retry history table using a first query comprising the flow identifier and the first branch identifier; and generating a first query result responsive to the first query by:

retrieving a first retry count from the retry history table, retrieving a threshold retry count, determining the first retry count is less than the threshold retry count so as to generate a first retry instruction, and incrementing the first retry count to provide a second retry count stored in the retry history table;

transmitting the first query result comprising the first retry instruction; and retrying the second request from the first service to the second service so as to generate a retried second request in response to the first retry instruction in the first query result.

18. The system of claim 17, wherein the querying by the first service the retry history further comprises:

determining that the retry history table indicates absence of a record for the flow identifier and the first branch identifier, and in response:

inserting a record for the first retry count into the retry history table indexed by the flow identifier and the first branch identifier;

setting the first retry count for the record to an initial value; and wherein the first retry count of first query response is the initial value.

19. The system of claim 17, wherein operations further comprise:

determining that the retried second request has failed;

querying by the first service the retry history table using a second query comprising the flow identifier and the first branch identifier;

generating a second query result responsive to the second query by:

retrieving the second retry count from the retry history table, retrieving the threshold retry count, and determining the second retry count is not less than the threshold retry count so as to generate an error message; and transmitting the second query result comprising the error message.

20. The system of claim 19, wherein the error is returned to one of a gateway and a third service.

\* \* \* \* \*